(12) United States Patent
Sosa et al.

(10) Patent No.: US 7,754,817 B2
(45) Date of Patent: Jul. 13, 2010

(54) LOW TEMPERATURE INITIATORS FOR IMPROVING THE RUBBER PHASE VOLUME OF HIPS FORMULATIONS

(75) Inventors: Jose M. Sosa, Deer Park, TX (US); Shazia Ullah, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 803 days.

(21) Appl. No.: 11/262,641

(22) Filed: Oct. 31, 2005

(65) Prior Publication Data

US 2007/0100079 A1  May 3, 2007

(51) Int. Cl.
*C08F 263/00* (2006.01)
*C08F 293/00* (2006.01)
(52) U.S. Cl. .................................. 525/244; 525/267
(58) Field of Classification Search .................. 525/244, 525/267
See application file for complete search history.

(56) References Cited

U.S. PATENT DOCUMENTS

| | | | |
|---|---|---|---|
| 4,309,515 A * | 1/1982 | Corley | 525/316 |
| 4,378,452 A * | 3/1983 | Iwamoto et al. | 525/263 |
| 4,777,210 A | 10/1988 | Sosa et al. | |
| 4,861,827 A | 8/1989 | Sosa et al. | |
| 6,177,512 B1 * | 1/2001 | Gibbons et al. | 525/53 |
| 6,353,066 B1 | 3/2002 | Sosa | |
| 6,486,271 B1 | 11/2002 | Sosa et al. | |
| 6,608,150 B1 * | 8/2003 | Wicher | 526/73 |
| 6,703,460 B1 | 3/2004 | Blackmon et al. | |
| 6,770,716 B1 | 8/2004 | Sosa | |
| 6,822,046 B2 | 11/2004 | Li et al. | |
| 6,893,584 B2 | 5/2005 | Bock et al. | |

OTHER PUBLICATIONS

U.S. Appl. No. 10/723,656, filed May 26, 2005, Sosa, et al.
Keskkula, H.; Factors Influencing Rubber Phase Morphology in Polystyrene; Plastics and Rubber: Materials and Applications, May 1979, pp. 66-70, USA.

* cited by examiner

*Primary Examiner*—David Wu
*Assistant Examiner*—Michael M Bernshteyn
(74) *Attorney, Agent, or Firm*—Tenley R. Krueger (57) ABSTRACT

Peroxide initiators are disclosed that can be used at lower temperatures during HIPS production. Enhanced formation of graft polymers between polystyrene and polybutadiene (rubber) can be accomplished by using these lower temperature peroxide initiators that have a 1 hour half-life period at one or more temperatures from 95° C. to less than 111° C. during the pre-inversion stage. "Higher" temperature initiators are used during and/or after inversion. The use of such "low" temperature initiators improves polymerization rates and grafting values, while reducing the swell index and the amount of rubber used, thereby producing improved HIPS more rapidly and at a lower cost. Also disclosed are HIPS compositions and products produced by such "low" temperature initiators as well as a method of producing improved HIPS.

8 Claims, 3 Drawing Sheets

LOW TEMPERATURE INITIATORS FOR IMPROVING THE RUBBER PHASE VOLUME OF HIPS FORMULATIONS

FIELD OF THE INVENTION

Embodiments of the present invention generally relate to a method of producing HIPS using a low or "lower" temperature initiator to improve the properties of HIPS. The present invention also particularly relates to an improved HIPS copolymer and a "low" temperature initiator for the production of such improved HIPS.

BACKGROUND OF THE INVENTION

The polymerization of styrene is a very important industrial process that supplies materials that are used to create a wide variety of polystyrene-containing articles. This expansive use of polystyrene results from the ability to control the polymerization process. Thus, variations in the polymerization process conditions are of utmost importance since they in turn allow control over the physical properties of the resulting polymer. The resulting physical properties determine the suitability of polystyrene for a particular use. For a given product, several physical characteristics must be balanced to achieve a suitable polystyrene material.

The physical properties of polymers such as polystyrene are frequently modified by strengthening the polymer matrix with toughening agents such as rubbers. One common application is the production of such rubber reinforced polymers is "High Impact Polystyrene" or "HIPS," which is well known in the art. Moreover, it is desirable to improve the process for producing HIPS for product improvement and profitability.

While existing processes and initiators are useful for preparing commercial quantities of HIPS, these processes are often not optimized and could be improved so that they can be conducted more rapidly and/or more efficiently. Further, there are improvements that could be made in the property of the HIPS that is produced.

Therefore, a need exists to more efficiently and economically produce HIPS. A need also exists to improve the properties of the HIPS that is produced. A need further exists for an initiator that can be used at lower temperatures to more rapidly and more efficiently produce HIPS.

SUMMARY OF THE INVENTION

There is provided, in one form, a high impact polystyrene (HIPS) resin, made from a vinyl monomer, an elastomer, at least one "lower" temperature peroxide initiator having a 1 hour half-life decomposition temperature, and one or more "higher" temperature peroxide initiators having a 1 hour half-life decomposition temperature that is higher than that of the "lower" temperature peroxide initiator, where the "lower" temperature initiator is used during pre-inversion and causes an increase in grafting in the HIPS, the HIPS having grafting of 200% or more, and where the "higher" temperature initiators are added before, during, and/or after inversion.

In another embodiment, there is provided a high impact polystyrene (HIPS) resin prepared with a vinyl monomer, an elastomer such as rubber, at least one "lower" temperature peroxide initiator, and one or more "higher" temperature peroxide initiators having a 1 hour half-life decomposition temperature that is higher than that of the "lower" temperature peroxide initiator, where the "lower" temperature initiator is added during pre-inversion with the monomer and rubber and has a 1 hour half-life decomposition temperature at one or more temperatures of from 95° C. to less than 111° C. and wherein the initiator is chosen from 1,1,3,3-tetramethylbutyl esters of alkaneperoxoic acids that are unsubstituted at the alpha position and 1,1,3,3-tetramethylbutyl esters of aroylperoxoic acids that are ring substituted in any manner so as to result in a 1 hour half-life decomposition temperature within the low temperature range; 1-alkoxy-1-t-alkylperoxycyclohexanes in which the t-alkylperoxy group contains 4-8 carbons, the alkoxy group contains 2-5 carbons, and the cyclohexane may be substituted with up to 3 alkyl groups independently having 1-3 carbon atoms each; or any combination of the foregoing initiators.

In a further embodiment, there is provided a high impact polystyrene (HIPS) resin, made of: a monomer comprising styrene, an elastomer, at least one "low" temperature peroxide initiator half-life, and one or more "high" temperature peroxide initiators having a 1 hour half-life decomposition temperature that is higher than that of the "low" temperature peroxide initiator, where the "low" temperature initiator is added in a pre-inversion reactor with the monomer and elastomer, and wherein the "low" temperature initiator causes an increase in % gels and/or % grafting in the HIPS resin, as compared to other initiators used during pre-inversion.

Additionally, there is provided an improved high impact polystyrene (HIPS), that includes: a monomer feed comprising styrene, an elastomer, at least three organic peroxide initiators, wherein one of the organic peroxide initiators has a "lower" 1 hour half-life decomposition temperature, where another of the organic peroxide initiators has an "intermediate" 1 hour half-life decomposition temperature, and where at least one other of the organic peroxide initiators has a "higher" 1 hour half-life decomposition temperature, where the monomer, elastomer, and one or more of the initiators are reacted for a time and at a temperature sufficient to effect at least partial decomposition of the lower half-life organic peroxide and initiate polymerization of the styrene monomer, and where the "lower" temperature peroxide initiator causes an increase in the percent grafting and/or percent gel of the HIPS as compared to using other initiators with other 1 hour half-life decomposition temperatures.

Also disclosed is an improved copolymerized HIPS product made by the method including: copolymerizing at least one vinylaromatic monomer with at least one diene polymer in the presence of a "lower" temperature peroxide initiator, and one or more "higher" temperature peroxide initiators, such initiators having a 1 hour half-life decomposition that is higher than that of the "lower" temperature peroxide initiator, where the "low" temperature initiator has a 1 hour half-life decomposition temperature at one or more temperatures of from 95° C. to less than 111° C. and is used in a pre-inversion reactor with the monomer and diene polymer, and recovering a copolymerized product that has at least 200% grafting.

In still another embodiment of the invention, there is a "low" temperature initiator for HIPS production, which has a half-life period of 1 hour at from 95° C. to less than 111° C., wherein the initiator is chosen from 1,1,3,3-tetramethylbutyl esters of alkaneperoxoic acids that are unsubstituted at the alpha position and 1,1,3,3-tetramethylbutyl esters of aroylperoxoic acids that are ring substituted in any manner so as to result in a 1 hour half-life decomposition temperature within the low temperature range; 1-alkoxy-1-t-alkylperoxycyclohexanes in which the t-alkylperoxy group contains 4-8 carbons, the alkoxy group contains 2-5 carbons and the cyclohexane may be substituted with up to 3 alkyl groups independently having 1-3 carbon atoms each; or any combination of the foregoing initiators, wherein the initiator is used during the pre-inversion phase along with a monomer and an elastomer, the initiator producing HIPS with increased grafting as compared to using other initiators with other 1 hour half-life decomposition temperatures.

In yet another embodiment of the invention, there is a "low" temperature initiator for solution polymerization of HIPS resins, where the peroxide initiator has a half-life period of 1 hour at from 95° C. to less than 111° C., wherein the initiator is chosen from 1,1,3,3-tetramethylbutyl esters of alkaneperoxoic acids that are unsubstituted at the alpha position and 1,1,3,3-tetramethylbutyl esters of aroylperoxoic acids that are ring substituted in any manner so as to result in a 1 hour half-life decomposition temperature within the low temperature range; 1-alkoxy-1-t-alkylperoxycyclohexanes in which the t-alkylperoxy group contains 4-8 carbons, the alkoxy group contains 2-5 carbons and the cyclohexane may be substituted with up to 3 alkyl groups independently having 1-3 carbon atoms each; or any combination thereof, and where the initiator is used during pre-inversion.

In a further embodiment of the invention, there is a method of making improved HIPS using the "low" temperature initiator of this invention, that includes: copolymerizing at least one vinylaromatic monomer with at least one diene polymer in the presence of a the "low" temperature initiator in a pre-inversion reactor and grafting at least a portion of the diene polymer with at least a portion of the vinylaromatic polymer in the presence of the "low" temperature initiator at one or more temperatures of from 95° C. to less than 111° C., copolymerizing at least one vinylaromatic monomer with at least one diene polymer in the presence of an "intermediate" temperature initiator in a pre-polymerization reactor and grafting at least a portion of the diene polymer with at least a portion of the vinylaromatic polymer in the presence of the "intermediate" temperature initiator at one or more temperatures of from 111° C. to less than 125° C., copolymerizing at least one vinylaromatic monomer with at least one diene polymer in the presence of a "high" temperature initiator in a polymerization reactor and grafting at least a portion of the diene polymer with at least a portion of the vinylaromatic polymer in the presence of the "high" temperature initiator at one or more temperatures of from 125° C. to 140° C. or higher, and recovering a copolymerized product that has at least 25% gels and at least 200% grafting.

Further embodiments of the invention include an improved copolymerized HIPS product made with the "low" temperature initiator, and articles made from the improved HIPS product.

DETAILED DESCRIPTION

Introduction and Definitions

A detailed description will now be provided. Each of the appended claims define an invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Each invention will now be described in greater detail below, including specific embodiments, versions and examples, but the invention is not limited to those embodiments, versions or examples, which are included to enable a person having ordinary skill in the art to make and use the inventions, when the information in this patent is combined with available information and technology. Various terms as used herein are shown below. To the extent a term used in a claim is not defined below, it should be given the broadest definition that persons in the pertinent art have given that term as reflected in printed publications and issued patents.

Definitions

The term "alkoxy" refers to or containing a univalent organic radical consisting of an alkyl group attached to oxygen ($C_nH_{2n+1}$—O—).

The term "alkyl" refers to an alkane absent hydrogen ($C_nH_{2n+1}$).

The term "bifunctional initiator" refers to a substance or molecule other than a reactant that initiates a chain reaction and has two reactive sites.

The term "chain" refers various lengths of repetitive units of atoms (monomer residues) which make up the polymer, and which affect the properties of the polymer.

The term "chain transfer agent" refers to an agent used in polymerization, which has the ability to stop the growth of a molecular chain by yielding an atom to the active radical at the end of the growing chain. It in turn is left as a radical that can initiate the growth of a new chain. Chain transfer agents can be useful for lowering molecular weights in polymerization reactions.

The term "cis" is a prefix which refers to a form of isomerism in which atoms are located on the same side of an asymmetric molecule.

The term "Continuous Stirred-Tank Reactor," and "Continuously-Stirred Tank Reactor" and "CSTR," refers to a stirred tank with provisions for continuously adding reactants and withdrawing products; a CSTR can be used for a variety of reactions and processes.

The term "conversion" refers to the extent to which monomer is converted to polymer and it is expressed as a percent.

The term "copolymer" refers to a mixed polymer; the product of polymerization of two or more substances at the same time. A copolymer molecule can be a random copolymer molecule, a block copolymer molecule (e.g., di-block, tri-block, multi-block, taper-block), a graft copolymer molecule or a comb copolymer molecule.

The term "copolymerization" refers to polymerization in which a copolymer is formed.

The term "cross-link" refers to covalent bonds between adjacent polymer chains that lock the chains in place.

The term "cross-linking agent" refers to a substance that promotes or regulates intermolecular covalent bonding between polymer chains, linking them together to create a more rigid structure.

The term "decomposition" refers to the act or result of decomposing, disintegration, or separation into constituents by chemical reaction.

The term "diester" refers to an organic compound that contains two ester groups.

The term "elastomer" refers to any of various polymers having the elastic properties of natural rubber.

The term "ester" refers to the product of an alcohol and an organic acid.

The term "feed stream" refers to a flow or succession of feed material (liquids and/or solids) that is supplied for various processes, often as starting material.

The term "filler" refers to a relatively inert material added to a plastic to modify its strength, permanence, working properties, or other qualities, or to lower costs.

The term "film" refers to a thin sheet or strip of flexible material, usually having a thickness not greater than 0.30 mm. A film can be made from one or more layers, and one or more materials.

The term "final conversion" refers to the amount of change of the feed monomer into the polymer polystyrene at the end of all polymerization reactions.

The term "free radical polymerization" is a type of polymerization in which the propagation head of a polymer chain consists of an atom or diatomic or polyatomic molecules which possesses one unpaired electron. Reactions involving free radicals are usually divided into three categories: initiation, propagation, and termination. Initiation reactions are those which result in a net increase in the number of free radicals. They may involve the formation of free radicals from stable species or they may involve reactions of free radicals with stable species to form more free radicals. Propagation reactions are those reactions involving free radicals in which the total number of free radicals remains the same. Termination reactions are those reactions resulting in a net decrease in the number of free radicals. Typically two free radicals combine to form a more stable species.

The term "G/R" refers to the ratio of the percent (%) gel to the percent (%) rubber, and is a measure of the rubber phase volume (RPV).

The term "grafting" refers the chemical uniting of two or more different polymers or polymeric entities.

The term "initiator" refers to a substance or molecule, other than reactant, that initiates a chain reaction, such as in polymerization. Typically the initiator decomposes to form either radical, anionic, or cationic species that serve as reactive sites for the propagation of chain polymerization.

The term "MM" or "molecular mass" refers to the mass of the substance divided by amount of substance, and is usually expressed in g/mol or kg/mol units. Molar mass is informally referred to as molecular weight.

The term "molecular weight distribution" or "MWD" refers to the frequency of occurrence of the different molecular weight chains in a homologous polymeric system.

The term "molecule" refers to the smallest particle of a pure chemical substance that still retains its chemical composition and properties. A molecule is made of two or more atoms joined by shared pairs of electrons in a chemical bond. It may consist of atoms of the same chemical element, or of different elements.

The term "monomer" typically refers to a small molecule of low molecular weight that may become chemically bonded to other monomers to form a polymer.

The term "output" refers to the amount or quantity produced.

The term "parts per million" or "ppm" is a measure of concentration that is used where low levels of concentration are significant. The ppm value is equivalent to the absolute fractional amount multiplied by one million ($10^6$).

The term "peroxide" is a specific functional group or a molecule containing the functional group ROOR'. Organic peroxides tend to decompose easily to free radicals of the form: RO. This makes them useful as catalysts for some types of polymerization.

The term "phase inversion" or "inversion" refers to the stage in the polymerization at which the dispersed polystyrene phase becomes continuous and the continuous rubber phase becomes discontinuous; occurs when the volumes of the dispersed phase is comparable with that of the continuous phase.

The term "polymer" is a generic term used to describe a substantially long molecule which has structural units and repeating units connected by chemical bonds. A polymer has chains of varying lengths, and differing chain lengths occur because polymer chains terminate during polymerization after random intervals of chain lengthening (propagation).

The term "polymerization" refers to a process of reacting monomer molecules together in a chemical reaction to form linear chains or a three-dimensional network of polymer chains.

The term "polystyrene" refers to a synthetic polymer (e.g., a simple one ring aromatic group with a vinyl group attached).

The term "pre-inversion" refers to the stage in a polymerization in which polystyrene forms the discontinuous phase and the rubber-styrene solution is the continuous phase and/or where styrene and rubber initially are in solution, with the styrene-polystyrene material existing as small droplets in the of styrene-rubber continuous phase.

The term "reactant" refers to substances that exist at the start of a chemical reaction. During the course of a reaction, the reactants form one or more products.

The term "reactive site" refers to a propagating site on the initiator which is unstable and highly reactive, at which a reaction can occur; a reactive site remains at the end of the chain until it is quenched.

The term "resin" refers to any class of solid or semisolid organic products of natural or synthetic origin with no definite melting point, generally of high molecular weight. Most resins are polymers.

The term "rubber" refers to a natural, synthetic, or modified high polymer with elastic properties and, after vulcanization, elastic recovery; the term "rubber" is often used interchangeably with the term "elastomer".

The term "used" refers the condition or fact of being used, brought into service, or employed for some purpose.

The term "vinyl" refers to an organic molecule which contains a vinyl group ($H_2C=CHR'$), where R is a functional group such as an aromatic or halogen.

The term "viscosity" refers to a measure of the resistance of a fluid to deformation under shear stress. Viscosity describes a fluid's internal resistance to flow and may be thought of as a measure of fluid friction.

The term "weight percent" refers to the percent by weight of the total molecular weight expressed as the real molecular weight (M), which is the sum of the atomic weights of all the atoms in a molecule, also known as relative molecular mass.

Description

This present invention relates to thermoplastic compositions utilizing polymers of monovinylaromatic compounds that have been modified with rubber to increase their impact strength and which are particularly useful for manufacturing articles requiring increased environmental stress crack resistance (ESCR). The produced copolymer has an impact resistance superior to that of polystyrene homopolymer. Methods for preparing polystyrene and HIPS are well-known in the art.

A non-limiting embodiment of the present invention provides a high impact polystyrene material containing a polybutadiene or styrene-butadiene rubber, produced by using a "low" temperature peroxide initiator during the pre-inversion stage. In a non-limiting embodiment, the combination of "low" or "lower" and "higher" temperature initiators produces HIPS with improved properties, such as enhanced grafting and rubber phase volume, decreased swell index, and a decreased percentage of rubber. In a further non-limiting embodiment, the use of "low", "intermediate", and "high" temperature initiators added separately or together produces HIPS with improved properties. Also by using a "low" temperature initiator, the production of HIPS is faster and thus more efficient.

In a non-limiting embodiment, batch or continuous polymerizations can be used to make certain compositions of the invention, by polymerizing styrene with or without other monomers in the presence of from 2 to 15 weight percent of an elastomer such as polybutadiene, and in some embodiments from 4 to 12 weight percent polybutadiene, the rubber first being dissolved in the polymerizable monomer and this solution then being subjected to polymerization in the presence of one or more initiators. In a non-limiting embodiment, the polymerization utilized in this invention can be carried out in a conventional manner by mass polymerization, solution polymerization, or polymerization in aqueous dispersion.

In a non-limiting embodiment, the feed monomer is styrene. In another non-limiting embodiment, the majority of the feed monomer is styrene, comprising from 85 weight percent to 95 weight percent of the feed material. Up to 15 weight percent of the styrene may be replaced by other ethylenically unsaturated monomers such as alkylstyrenes, alpha methylstyrene, acrylic acid esters and acrylonitrile, methyl methacrylate, butyl acrylate, butyl methacrylate, methyl acrylate, octyl methacrylate, octyl acrylate, ethyl acrylate, 2-ethylhexyl acrylate, vinyl toluene, or any combination thereof.

Several types of elastomers are suitable for producing HIPS. For example, one or more of the following types of rubber can be used in this invention: natural rubber, styrene-butadiene rubber, carboxylic styrene-butadiene rubber, nitrile rubber, carboxylic nitrile rubber, chloroprene rubber, polybutadiene, acrylic rubber, butadiene-styrene-vinylpyridine rubber, isoprene rubber, butyl rubber, ethylene-propylene rubber, polysulfide rubber, acrylate-butadiene rubber, urethane rubber, and fluorine rubber. The selected rubbers should be soluble in styrene in order to be used in the conventional HIPS process.

Grafting is favored by using polybutadiene having a medium or high-cis isomer content. Polybutadiene useful in making the composition of the invention is produced, for example, by known processes by polymerizing butadiene in either a hexane or cyclohexane solvent to a concentration of about 12 weight percent, and flashing off the unreacted monomer and the solvent and/or diluent at a temperature ranging from about 80° C. to 100° C., to further concentrate the polybutadiene solution to about 24 to 26 weight percent, the approximate consistency of rubber cement. Crumb polybutadiene is then precipitated from the solution using steam, and is then dried and baled. Examples of such commercially available rubbers are Lanxess 380, 550, and 710 (Lanxess Corporation, Orange, Tex.) and Firestone Diene 35, 55 and 70 (Firestone Polymers, Akron, Ohio); other rubbers known to those skilled in the art can also be used.

In a non-limiting embodiment, medium cis polybutadiene has an isomer content of 40% and high cis polybutadiene has an isomer content of 96% to 99%. Firestone Diene 35, for example, contains approximately 35% cis-1,4 structure, approximately 55% trans-1,4 structure, and approximately 10% vinyl-1,2 structure having a Mooney viscosity of the rubber (ML-4, 212° F.) at 35. As a further example, Firestone Diene 55 has a Mooney viscosity of approximately 55, a number molecular weight of about 150,000, weight average molecular weight of about 300,000, and a Z average molecular weight of about 500,000 as measured by the gel permeation technique.

Peroxide initiators have been used to increase the rate of polymerization and to modify the degree of chemical grafting between polystyrene and the elastomer used to modify polystyrene. Increasing the rate of polymerization by using initiators causes the molecular weight of the polystyrene matrix to decrease; chemical grafting may or may not increase depending on the levels and the temperature at which the initiator is used. Thus, the use of initiators to manufacture high impact polystyrene (HIPS) requires an optimization of rate, process temperatures, molecular weight, chemical grafting, and other parameters. Grafting initiators can be used in one or both continuous stirred tank reactors to induce the desired amount of grafting of polymer to rubber particles.

For rubber toughened materials like high impact polystyrene, factors that influence rubber morphology, such as rubber particle size, rubber particle size distribution, swell index, grafting, and the rubber phase volume, as measured by the ratio of the % gel to % rubber (G/R), are also critical to balance physical and mechanical properties. For conventional HIPS resins, the rubber phase volume is a key parameter that can be estimated from solution properties. The rubber phase volume refers to the rubber particles or discontinuous phase, which consists of rubber, trapped polystyrene (occlusions) and grafted polymer.

The predominant morphology of the polymer embodiments of the invention is cellular like "salami" with some core-shell structure, meaning that the continuous phase of polystyrene comprises a plurality of dispersed structures in which polystyrene is trapped within rubber particles that have a distinct membrane and small quantities of polystyrene occluded inside single cell rubber shells, such as polybutadiene, that are grafted to the aromatic polymer. It is desirable to make a composite in which the polystyrene matrix (continuous phase) has a large volume of rubber particles (discontinuous phase) with high levels of trapped polystyrene.

It has been discovered that certain initiators with a "low" 1 hour half-life decomposition temperature, can enhance chemical grafting while maintaining or increasing polystyrene matrix molecular weight. It has also been discovered that the use of such "low" temperature initiators increase the rubber efficiency by decreasing the percentage of rubber used, as compared with other initiators used in pre-inversion reactors, at the same temperature, and in another non-limiting embodiment, at higher temperatures. As used herein, the term "low" temperature or "lower" temperature initiators are those with a 1 hour half-life decomposition temperature at one or more temperatures of from 95° C. to less than 111° C. and, in an additional non-limiting embodiment from 104° C. to 110° C. In a non-limiting embodiment, initiators with "higher" 1 hour half-life decomposition temperatures are used in subsequent reactors.

For conventional HIPS resins, the rubber phase volume is a key parameter that can be estimated from solution properties. The rubber phase volume refers to the rubber particles or discontinuous phase, which consists of rubber, trapped polystyrene (occlusions) and grafted polymer. A convenient way to classify HIPS materials is by calculating the dry gel obtained for a given rubber level. The rubber phase volume (RPV) is determined by the G/R ratio, the ratio of the % gel to % rubber. The G/R ratio is important in the manufacture of HIPS materials because it represents the "rubber efficiency" of the process, i.e., how much rubber must be used to obtain similar product quality. The less rubber needed to produce a set of desired properties in a HIPS material, the more efficient the process. By using the "low" temperature initiators of this invention, one or more of such properties can be improved.

For conventional commercial HIPS materials, the gel/rubber ratio (G/R) can vary from 1 to 4 for swell indices of 10-12, and as the swell index increases the G/R ratio decreases. However for the HIPS materials of this invention made with a "low" temperature initiator, the G/R ratio is increased as compared to HIPS made with a control initiator. Generally, for this invention, the G/R increases from about 1.9 to 3 or more as the concentration of the "low" temperature initiator is increased, while the swell index varies from about 11 to about 20, and is generally decreased in relation to the control initiator. In another non-limiting embodiment of the invention, the percent grafting is improved at higher concentrations of the "low" temperature initiator even though the percent rubber is decreased. The improvement seems to be due to the fact that the polystyrene occlusions are larger, and thus the rubber volume is increased. This unexpected phenomenon is discussed further with respect to the test data below.

The percent gel is measured by dissolving the HIPS resin in toluene, separating the gel fraction by centrifugation, drying the wet gel, and then reporting the percent of insoluble gel of the total sample. The percent (%) gel is then calculated from this dried residue by:

$$\% \text{ Gel} = 100 \times \frac{\text{dried gel sample weight}}{\text{initial gel sample weight}} \quad \text{(Formula 1)}$$

Swell index (SI) is measured in the same test as % gels. After separating the insoluble gel phase by centrifugation, the swollen gel is weighed, dried under vacuum and then the weight of the dry gel is obtained. The swell index is the ratio of the weight of swollen gel to dry gel, and it is a measure of the degree of cross-linking of the rubber phase. The swell index is common parameter used to characterize the cross-linking degree of a rubber, and can be determined by one or more methods well-known in the art.

The percent rubber is the total amount of rubber in the HIPS and is measured by the well-known Iodine Monochloride (I—Cl) titration method. The less rubber needed to produce a set of desired properties in a HIPS material, the more efficient the process.

The grafting percent can be obtained as follows:

$$\% \text{ grafting} = 100 \ (\% \text{ gels} - \% \text{ rubber})/\% \text{ rubber}. \quad \text{(Formula 2)}$$

The percent grafting is the same as 100 (G/R−1).

Figure 1:
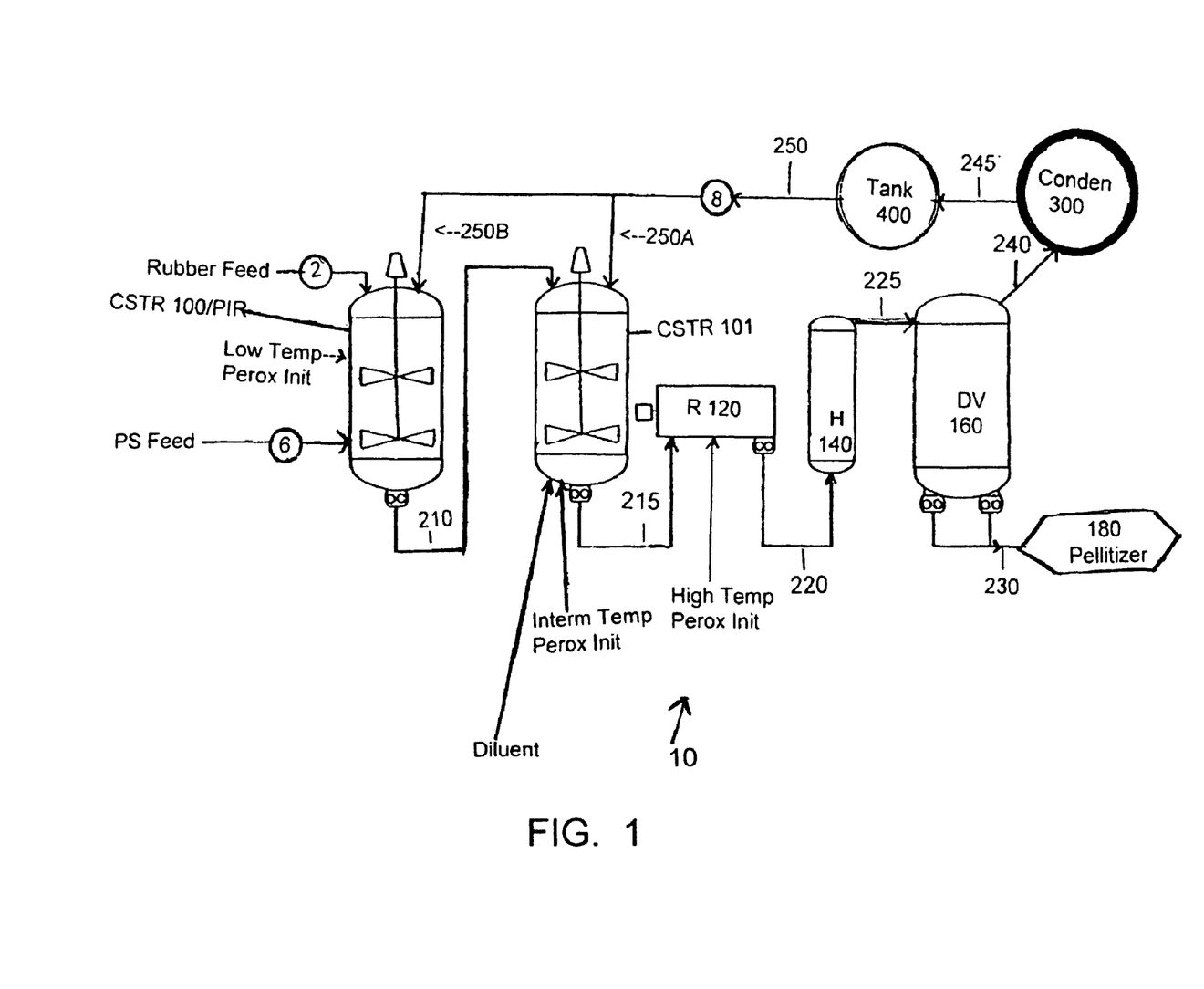
FIG. 1 is a schematic of a system that can be used to produce the HIPS of this invention.

By using initiators that work at lower temperatures and cause more grafting in the polymers, the properties of HIPS can be improved. For example, increased grafting increases the environmental stress crack resistance (ESCR), as well as the ductility as measured by tensile properties. In contrast if the temperature during polymerization is too high, the polymerization of such molecules is too fast and the inversion stage is reached before grafting can occur. It is desirable to form as much grafted polymer as possible in the PIR (pre-inversion reactor), so that when inversion occurs, the polystyrene droplets inside the rubber particle will be stabilized. By utilizing an initiator that can be used at lower temperatures, the amount of very small rubber particles in a polystyrene matrix is reduced. It was discovered in U.S. Pat. No. 4,777,210 to Sosa et al., which is hereby fully incorporated herein by reference, that the rubber particle size in the CSTR 101 is substantially equivalent to the rubber particle size in the resultant HIPS pellets. By controlling the solution which is fed into CSTR 101 from the PIR/CSTR 100, the same rubber particle sizes will be present in the HIPS product as, they are in CSTR 101.

A wide variety of peroxy compounds are known to those skilled in the art as initiators for the production of styrenic polymers. Commercially available initiators for polymer production can be classified in different chemical groups, which include diacylperoxides, peroxydicarbonates, dialkyl peroxides, peroxyesters, peroxyketals, hydroperoxides, or combinations thereof. Initiators are selected on the basis of their half-life decomposition temperatures to provide a measured supply of radicals at selected points along the temperature profile so that effective conversion occurs within an acceptable period of time. For styrene polymerization, it is convenient to describe initiator decomposition performance in terms of 1 hour half-life temperature, defined as that temperature sufficient to cause decomposition of one half the starting concentration of initiator over a 1 hour time period. One or more copolymerizable organic peroxide initiators are added to the polymerization mixture at one or more stages of the polymerization process. In non-limiting embodiments of the invention, the concentrations of the peroxide initiators range from 50 ppm to 1200 ppm, from 100 ppm to 950 ppm, and in a further non-limiting embodiment from 50 ppm to 600 ppm.

In a non-limiting embodiment, the half-life decomposition temperature measurements are determined by measuring the rate of initiator decomposition in the aromatic solvent cumene, as disclosed in U.S. Pat. No. 6,608,150 to Wicher, which has been fully incorporated herein for all purposes.

Otherwise, the half-life decomposition temperatures of the commercially available peroxides that can be used in conjunction with this invention are the temperatures as determined by the respective manufacturers. It is to be understood that other solvents known to one skilled in the art can also be used to determine the half-life decomposition temperatures of the initiators disclosed herein, as half life measurement techniques are well known by those skilled in the art. This disclosure is further intended to also cover other solvents and methods of determining half-life decomposition temperatures which can be used for the disclosed initiators. In a non-limiting embodiment, such non-cumene solvents include non-polar solvents such as benzene, isodecane, or hexadecane, or other non-polar solvents in which the initiators are soluble. Of course, other solvents that are known to one skilled in the art for such purposes can also be used to determine half-life decomposition temperatures.

In a non-limiting embodiment, suitable "low" or "lower" temperature peroxides that can be used include, but are not limited to, 1,1,3,3-tetramethylbutyl (t-octyl) esters of alkaneperoxoic acids that are unsubstituted at the alpha position; 1,1,3,3-tetramethylbutyl (t-octyl) diesters of alkanediperoxoic acids that are unsubstituted at the alpha positions; and, 1,1,3,3-tetramethylbutyl (t-octyl) esters of aroylperoxoic acids and 1,1,3,3-tetramethylbutyl (t-octyl) diesters of aroyldiperoxoic acids that are ring substituted in such manner as to result in a peroxide half-life decomposition temperature within the described range; 1-alkoxy-1-t-alkylperoxycyclohexane, where the t-alkyl group contains 4 to 8 carbon atoms, including, without limitation, 1-alkoxy-1-t-amylperoxycyclohexane and 1-alkoxy-1-t-hexylperoxycyclohexane, where the alkoxy group contains 1 to 8 carbon atoms and the cyclohexane ring may optionally be substituted with 1 to 3 alkyl groups, each independently having 1 to 3 carbon atoms, or any combination thereof.

In a further non-limiting embodiment, suitable "low" temperature peroxides that can be used include, but are not limited to, 1,1,3,3-tetramethylbutyl peroxyacetate (TOPA); 1,1,3,3-tetramethylbutyl peroxypropionate (TOPP); 1,1,3,3-tetramethylbutyl peroxy-3,5,5-trimethylhexanoate; di-(1,1,3,3-tetramethylbutyl)diperoxyadipate (DTODPA); 1,1,3,3-tetramethylbutyl peroxybenzoate (TOPB); di-1,1,3,3-tetramethylbutyl diperoxyterephthalate; and, 1-methoxy-1-t-amylperoxycyclohexane (TAPMC), or any combination thereof. The foregoing "low" or "lower" temperature initiators are disclosed in U.S. Pat. No. 6,608,150 to Wicher, which is fully incorporated herein for all purposes. Such "low" temperature initiators can be used at from 50 ppm to 1200 ppm, and in an alternative non-limiting embodiment from 100 ppm to 500 ppm.

It is also possible that additional peroxides which have a half life temperature range that is 5° C. to 10° C. less than that of the above-described "low" and "lower" temperature can also be used in this invention as "low" and "lower" temperature peroxides for the production of HIPS.

Additionally in a non-limiting embodiment, an experimental peroxide known as XPS which is made by Arkema, Philadelphia, Pa. (formerly Atofina Chemicals, Inc.) which is believed to be covered by the disclosure in the U.S. Pat. No. 6,608,150 to Wicher, has been found to be useful as an initiator that can be used at a "low" or "lower" temperature during the production of HIPS.

XPS allows enhanced grafting, and acts as a sort of graft "emulsifier." XPS appears to facilitate the abstraction of a hydrogen atom from polystyrene, as explained by H. Keskkula in "Factors Influencing Rubber Phase Morphology in Polystyrene," Plastics and Rubber: Materials and Applications, May 1979, pp. 66-70, which is hereby fully incorporated herein by reference.

The initiator XPS used alone or in combination with other higher temperature peroxides to improve polymerization rates and grafting values in the synthesis of HIPS, and allows the use of lower operating temperatures at from 95° C. to less than 111° C. It was also found that XPS can reduce the amount of rubber used, and the swell index. Thus improved HIPS can be produced at a lower cost.

There are many "intermediate" temperature initiators that are commercially available and/or known to one skilled in the art that can be used in this invention along with or after such "low" temperature initiators. The "intermediate" temperature initiators have a 1 hour half-life decomposition temperature that is higher than that of the "low" or "lower" temperatures initiators. As used herein, the term "intermediate" temperature initiators are those with a 1 hour half-life decomposition temperature at one or more temperatures of from 111° C. to 125° C.

There are many "intermediate" temperature initiators that are commercially available and/or are known to those skilled in the art for such purposes. In a non-limiting embodiment, diacylperoxides, peroxydicarbonates, dialkylperoxides, peroxyesters, peroxyketals, hydroperoxides, or combinations thereof can be used at from 50 ppm to 1200 ppm, and in further non-limiting embodiments at from 100 ppm to 500 ppm. In a non-limiting embodiment the bifunctional initiator Luperox® 531 (L-531) that contains 1,1-di-(t-amylperoxy)cyclohexane was used, and is commercially available from Arkema, Inc., Philadelphia, Pa. (formerly sold by Atofina Petrochemicals, Inc.). L-531 increases the rate of polymerization, and has a 1 hour half-life of 116° C. to 117° C., and thus the reactor temperature is at from 115° C. to 120° C. It will be obvious to one skilled in the art that there are numerous other peroxide initiators that may also be used with the "low" or "lower" temperature peroxide initiators to enhance conversion rates.

"High" temperature initiators can be used in this invention along with or after such "low" and "intermediate" temperature initiators. In a non-limiting embodiment, in the case of initiators with higher half lives, mixtures of initiators can be added as cocktails if the reactor temperature is 15 degrees lower than the half life of the "high" or "higher" temperature initiators. The "high" or "higher" temperature initiators have a 1 hour half-life decomposition temperature that is higher than that of the "low" or "lower" temperatures initiators and the "intermediate" temperature initiators, if such initiators are used. In a non-limiting embodiment, as used herein, the term "high" temperature initiators are those with a 1 hour half-life decomposition temperature at one or more temperatures of from 125° C. to 140° C. In a further non-limiting embodiment, "high" or "higher" temperature initiators can also be defined as those with a 1 hour half-life decomposition temperature at one or more temperatures of from 111° C. to 140° C., when "intermediate" temperature initiators are not specifically mentioned or used.

There are many "high" temperature initiators that are commercially available and/or are known to those skilled in the art for such purposes. In a non-limiting embodiment, diacylperoxides, peroxydicarbonates, dialkylperoxides, peroxyesters, peroxyketals, hydroperoxides, or combinations thereof can be used at from 50 ppm to 1200 ppm, and in further non-limiting embodiments at from 100 ppm to 500 ppm. In a non-limiting embodiment the bifunctional initiator Luperox® 233 (L-233) which contains ethyl 3,3 di-tert-butylperoxy butyrate, was used, and is commercially available from Arkema, Inc., Philadelphia, Pa. (formerly sold by Atofina Petrochemicals, Inc.). L-233 increases the rate of polymerization, and has a 1 hour half-life of 133° C., and thus in a non-limiting embodiment, the reactor temperature is from 130° C. to 135° C. It will be obvious to one skilled in the art that there are numerous other peroxide initiators that may also be used with the "low" or "lower" temperature peroxide initiators to enhance conversion rates.

Heat can also be used to initiate grafting and later polymerization. The chosen reaction temperature is based upon the one-hour half-life decomposition temperatures of the initiator used in each reactor.

Further details of the system and methods that can be used in conjunction with this invention will now be discussed. FIG. 1 illustrates a non-limiting schematic representation of the various components in a continuous flow process system 10 that can be utilized to practice the present invention and prepare improved HIPS. In a non-limiting embodiment, styrenic thermoplastic polymer resin compositions are prepared by feeding at least one monovinylic monomer, an elastomer such as polymeric rubber, and a "low" temperature initiator into one or more continuous stirred tube-type reactors that are assembled in series. An non-limiting overview of this system shows a first continuous stirred tube-type reactor 100 (CSTR) also known as a pre-inversion reactor (PIR), and a second CSTR 101 also known as a pre-polymerization reactor, and one or more preheaters 2, 6 that heat the monomer feed and rubber feed prior to introducing the feed materials into the reactors. After leaving the last CSTR, the materials enter at least one plug flow reactor R 120, where the majority of the polymerization occurs, then a heater H 140 also known as a devolatilizer preheater, a devolatilizer DV 160, and a condenser 300. The unreacted monomer and diluent are devolatilized in the devolitilzer DV 160, recovered, passed to a condenser where they are reduced to a liquid state, and directed to a storage vessel such as a continuous purge tank 400. From there, they may be recycled back into the polystyrene polymerization process at any desirable point such as 101 and/or 100 as feed material, or used for other purposes. In a non-limiting embodiment, the feed materials are heated in pre-heater 8 prior to being introduced into the reactors. The devolitilized HIPS is removed from the devolitilzer, and is finished in a pelletizer 180. One or more of the various foregoing components are connected by flow lines 210, 215, 220, 225, 230, 240, 245, 250, 250A, and 250B.

With regards to further details concerning HIPS production, in a non-limiting embodiment there are two or more continuous stir tank reactors assembled in series. In a non-limiting embodiment, each reactor has one or more reaction zones with independent temperature control. Reaction vessel 100 is operated at pre-inversion conditions, where the continuous phase is a styrene-rubber solution and the discontinuous phase is polystyrene. In a non-limiting embodiment, the feed materials and at least one initiator are agitated at a high rate in the first reactor and are polymerized to a point below the inversion point. In a non-limiting embodiment, a "low" temperature initiator that has a 1 hour half-life at 105° C. is added to the pre-inversion reactor 100, and the residence time of the materials can be adjusted. In a non-limiting embodiment, the residence time is 60 minutes or less. The mixture is heated in the pre-inversion reactor to a temperature of from 95° C. to 111° C. to initiate grafting and polymerization, with pressures at from 500 torr to 760 torr.

The feed solution from PIR 100 is introduced into the pre-polymerization reactor 101 through flow line 210. CSTR 101 has a lower agitation rate than reactor 100, and operates at a percent solids level above the inversion point. Thorough mixing in the pre-inversion reactor (PIR) 100 assists in trapping polystyrene within discrete rubber molecules so that when the mixture from the PIR is inputted into CSTR 101, instantaneous inversion of the feed results in rubber particles.

The viscosity of the solutions in the pre-inversion and in the second stirred tank reactor 101 are controlled to produce desirable high impact polystyrene (HIPS). In an embodiment, at least a portion of the monomer is converted into a polymer in the pre-inversion reactor and typically there is from 5% to 9% by weight polystyrene formed during this time, with a total of from 12% to 16% solids formed including rubber. Use of a pre-inversion reactor 100 promotes more thorough mixing of the rubber with the styrene/polystyrene mix prior to introducing the mixture into the pre-polymerization and plug flow reactors, also referred to herein as polymerization reactors.

In a non-limiting embodiment, one or more diluents, typically in portions of 10% or less, can also be added to one or more reactors before, along with, or after the feed is introduced. Diluents can be used in the pre-inversion reactor, but are not required, and in fact may be undesirable. Such diluents include but are not limited to ethyl benzene, toluene, xylenes, and cyclohexane, or a combination of one or more of the foregoing. Other diluents that are known to those skilled in the art can also be used for such purposes.

In a non-limiting embodiment, different initiators can be added to each of the reaction vessels. Other optional additives, such as lubricants such as mineral oils, plasticizers, nucleating agents, surfactants, cross-linking agents and/or chain transfer agents can be added before, along with, or after the initiators.

In a non-limiting embodiment, "intermediate" temperature peroxide initiators are added to the pre-polymerization reactor 101. There is a longer residence time in reactor 101, and in a non-limiting embodiment, the materials in the second reactor 101 are heated for from 2½ hours to 3½ hours, at a pressure of from 300 torr to 600 torr. Typically there are about 30% to 40% solids formed in the pre-polymerization reactor 101.

At least one plug flow reactor R 120 receives the output of the pre-polymerization reactor 101 through flow line 215. The majority of polymerization occurs in reactor 120. In a non-limiting embodiment, there are a plurality of plug flow reactors that are connected in series, usually 2 to 5 plug flow reactors and the residence time of the solution in the plug flow reactors is from usually up to 90 minutes to 120 minutes in each reactor. The percent solids are increased in each of the plug flow reactors. A peroxide initiator that operates in the "high" or "higher" temperature range is added to one or more of the plug flow reactors, with the temperature in the plug flow reactors being chosen to correspond to the half-life decomposition temperature of the initiator that is used.

In a non-limiting embodiment, 4 plug flow reactors are connected in series and the percent solids are increased in the first plug flow reactor up to 40% to 50%, further increased in the second plug flow reactor up to 50% to 60%, additionally increased in the third plug flow reactor up to 60% to 70%, and still further increased in the fourth plug flow reactor up to 70% to 80%. The particular heating conditions in the plug flow reactors can also be determined by monitoring the percent conversion in the reactors indicates the amount of polymer products that have been produced.

In one non-limiting embodiment, a possible temperature profile to be followed in producing the subject polymer compositions is at from 95° C. to 111° C. for from 45 minutes to 60 minutes, such as in a PIR, at from 111° C. to 125° C. for from 180 to 240 minutes, such as in a pre-polymerization reactor, and at from 125° C. to 140° C. for from 120 to 180 minutes in one or more plug flow or polymerization reactors. In a further non-limiting embodiment, the styrene is polymerized for up to 10 hours.

The output of the last plug flow reactor is directed through flow line 220 to an apparatus having a heater H 140 which is under vacuum pressure. In a non-limiting embodiment, the heater is a heat exchanger such as an upflow heat exchanger and can be operated at a temperature sufficient to induce polymerization, at from 150° C. to 180° C.). In a further non-limiting embodiment, a downflow heat exchanger is used and can be maintained at a temperature at from 230° C. to 255° C. and may be situated in a flash devolatilization tank having a vapor removal line 240 and maintained at a pressure in the range of from 2 torr to 10 torr, and in some apparatuses from 10 torr to 200 torr. After having been at least partially devolatilized in the heat exchanger 140, the output mixture passes from the heater through flow line 225 and is directed to a devolatilizer DV 160 that is operated at a pressure of from 1 Torr to 20 Torr, and a temperature of from 240° C. to 260° C., which vulcanizes the rubber. The devolitilzer separates unreacted monomer and any diluents from the polymerized materials, and the volatile components are removed through vapor line 240. The volatilized components are condensed in a condenser 300, stored in a tank 400, and can be returned to at least one of the continuous stir tank reactors as recycled feed materials, or can be used in another application. In a non-limiting embodiment, storage tank 400 is a continuous purge tank. Flow line 230 transports the devolatilized output mixture from devolatilizer 160 to a finishing operation such as pelletizer 180.

As a further illustration of how HIPS is produced, in a non-limiting embodiment, CSTR tanks 100 and 101 that hold 10,000 gallons are used and the feed material into the pre-inversion reactor 100 is comprised of 90 weight percent styrene monomer, 7 weight percent rubber, and 3 weight percent mineral oil. A "low" temperature initiator is added to reactor 100 at the desired concentration. In a further non-limiting embodiment, one or more "higher" temperature initiators can be added in the pre-inversion reactor, but in an additional non-limiting embodiment the "higher" temperature initiators are added in later reactors. In a non-limiting embodiment, the outflow from this reactor, which enters the pre-polymerization reactor 101, comprises 7 weight percent polystyrene, 83 weight percent styrene, 7 weight percent rubber, and 3 weight percent mineral oil. A "higher" temperature initiator is added to the reactor 101, at the desired concentration, which in a non-limiting embodiment is an "intermediate" temperature initiator. Also 7% to 8% by weight of diluent, can be added into the pre-polymerization reactor 101. In a non-limiting embodiment, the outflow from this reactor, which enters the first plug flow reactor 120, which can hold 1750 gallons, comprises 15% to 45% polystyrene, 60% styrene, 7% rubber, and 3% mineral oil. A still "higher" temperature initiator is added to one or more of the plug flow reactors, at the desired concentration. The outflow from the last plug flow reactor 120, comprises 60% polystyrene, 30% styrene, 7% rubber, 3% mineral oil. The unreacted rubber precipitates and becomes part of the rubber phase, whether it is grafted or not. The mineral oil does not react, but rather acts as a plasticizer.

If recycled styrene and/or diluent are used, the percentage of styrene and/or diluent in the feed material can be adjusted based upon the composition of the recycled materials from the devolitilzer DV 160. Thus, in a non-limiting embodiment, feed material into the pre-polymerization reactor 101 is comprised of from 82% to 83% styrene, 7% rubber, 7% to 8% diluent, and 3% mineral oil.

Further details regarding methods of preparing HIPS, and improved HIPS resins can be found in U.S. Pat. No. 4,777,210 to Sosa et al.; U.S. Pat. No. 4,861,827 to Sosa, et al.; U.S. Pat. No. 5,540,813 to Sosa et al.; U.S. Pat. No. 6,486,271 to Sosa et al.; U.S. Pat. No. 6,353,066 to Sosa; U.S. Pat. No. 6,703,460 to Blackmon et al.; U.S. Pat. No. 6,822,046 to Li et al.; and, U.S. application Ser. No. 10/723,656 to Sosa et al., all of which are hereby fully incorporated herein by reference.

The following examples further illustrate the best mode contemplated by the inventors for practicing the inventions and are intended as illustration only, and not as limiting.

Procedure

The inventors explored ways in which to reduce the cost of producing HIPS, increase polymerization rates, and grafting efficiencies. More specifically, the inventors explored the possibility of using initiators with half-life decomposition temperatures within pre-inversion reactor temperature ranges (from ~95° C. to 111° C.) to increase the radical flux in the PIR used in the HIPS process.

L233 (ethyl-3,3-di-(t-butylperoxy)-butyrate) is an additive that is frequently used in polystyrene formulations to increase polymerization rate, and adjust melt flow and molecular weight. L233 is a bifunctional initiator and has an 1-hour half-life equal to 134° C., and was used as a control.

Batch Experiments with XPS

Arkema (Philadelphia, Pa., formerly known as Atofina Peroxides) has produced a low temperature developmental initiator, known as XPS, that is derived from alkoxy cyclohexane. This initiator was originally designed to shorten the polymerization cycle for producing polystyrene beads for the expandable polystyrene suspension process, and is believed to be disclosed in U.S. Pat. No. 6,608,150 to Wicher, which is hereby fully incorporated herein by reference. The exact structure of XPS is not known. XPS was studied to determine the effect on the production of rubber containing monovinyl polymers such as styrene, and was tested for use in the HIPS process.

XPS has a 1 hour half-life decomposition temperature of from 104° C. to 106° C., which is lower than that of other initiators currently used, and could allow the use of "low" temperature initiators (t ½=95° C. to 111° C.), with "intermediate" temperature initiators (t ½=111° C. to 125° C.), and "high" temperature initiators (t ½=125° C. to 140° C.) to adjust the reaction profiles in continuous polymerization units. One combination of the initiators used was a "low" temperature initiator (t ½=105° C.), with an intermediate temperature initiator (t ½=115° C.), and a "high" temperature initiator (t ½=132° C.) to adjust the reaction profiles in continuous polymerization units. Table 1 shows the properties of the L-233, L-531, and XPS peroxide initiators.

TABLE 1

| | Properties of Peroxides | | |
|---|---|---|---|
| Product | Assay % | Active Oxygen % | 1 hr half-life ° C. ($t_{1/2}$) |
| L-233 | 75 | 8.3 | 134 |
| L-531 | 80 | 9.8 | 116 |
| XPS | 92 | 7.0 | 105 |

EXAMPLE 1

For this study, the reactivity of initiator XPS was compared to L-233. Batches of HIPS were run using 6% Bayer Diene 35 feed. Three levels of the XPS initiator were tested (100 ppm, 200 ppm, 300 ppm), along with a control of 170 ppm L-233. A standard batch run profile of 2 hours at 110° C., 1 hour at 130° C., and 1 hour at 150° C. was used for all of the runs. Samples were collected at the end of each ramp for rate analysis, along with a final devolatilized sample for HIPS properties and rate determination analyses. A differential scanning calorimeter (DSC) was used to confirm the polymerization rates. Table 2 shows the rate data collected from the batches.

TABLE 2

| | | Rate Data Comparison | | | |
|---|---|---|---|---|---|
| Temp ° C. | Time (min) | 170 ppm L-233 | 100 ppm XPS | 200 ppm XPS | 300 ppm XPS |
| 110 | 60 | 6.44 | 8.66 | 13.67 | 21.1 |
| 110 | 120 | 10.21 | 17.99 | 26.89 | 34.83 |
| 130 | 180 | 26.25 | 34.4 | 43.88 | 49.24 |
| 150 | 210 | 52 | 50 | 80 | 62 |

The data in Table 2 shows that XPS has more than 1.5 to twice the polymerization rate of the control, L-233, at 200 ppm levels in the first two ramps of the batch profile. At 300 ppm, the first ramp of the profile shows that XPS has more than triple the polymerization rate, as compared to L-233. Even at a low concentration of 100 ppm of XPS, there is still an improved rate over the L-233 control run at lower temperatures. These results indicate that high polymerization rates are possible when certain low or "lower" temperature initiators are used during the pre-inversion stage.

Figure 2:
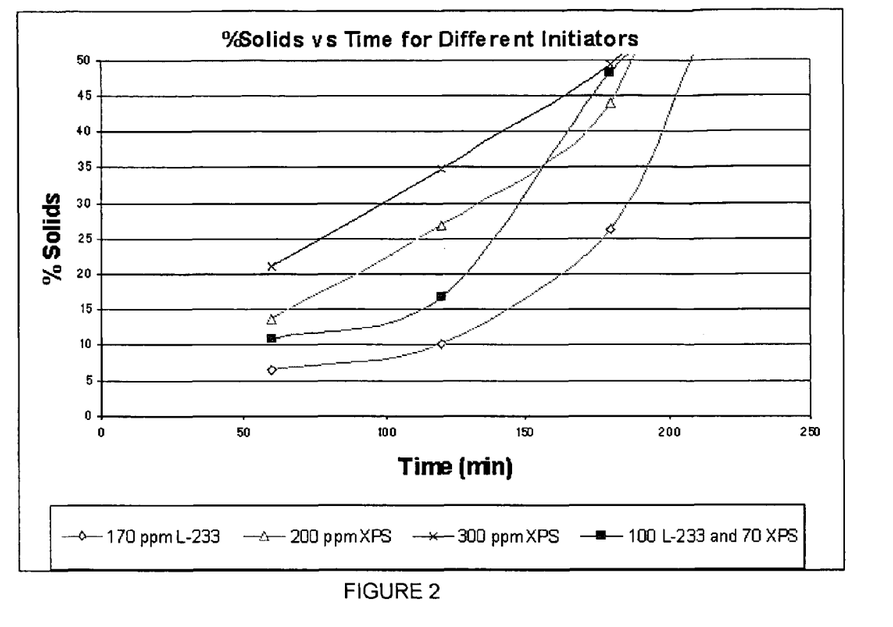
FIG. 2 is a plot of the % solids versus time for HIPS produced with initiators L-233, XPS, and L-233 plus XPS.

FIG. 2 is related to the data of Table 2 and shows a plot of the rate comparisons as % solids, and shows the amount of polymer formed, as a function of time in minutes. The HIPS produced with XPS has a higher percentage of solids as compared to the HIPS produced with the L-233 control.

Notwithstanding the observed increased rates of polymerization and % solids, the effects of the initiator on rubber phase properties must also be considered.

EXAMPLE 2

Based upon the foregoing initial results, further studies were undertaken to confirm the rate of improvement in batch process, and to determine test grafting efficiencies and HIPS properties. Several concentrations of the XPS initiator were tested, along with a L-233 formulation, and the results are shown in Table 3.

Figure 4:
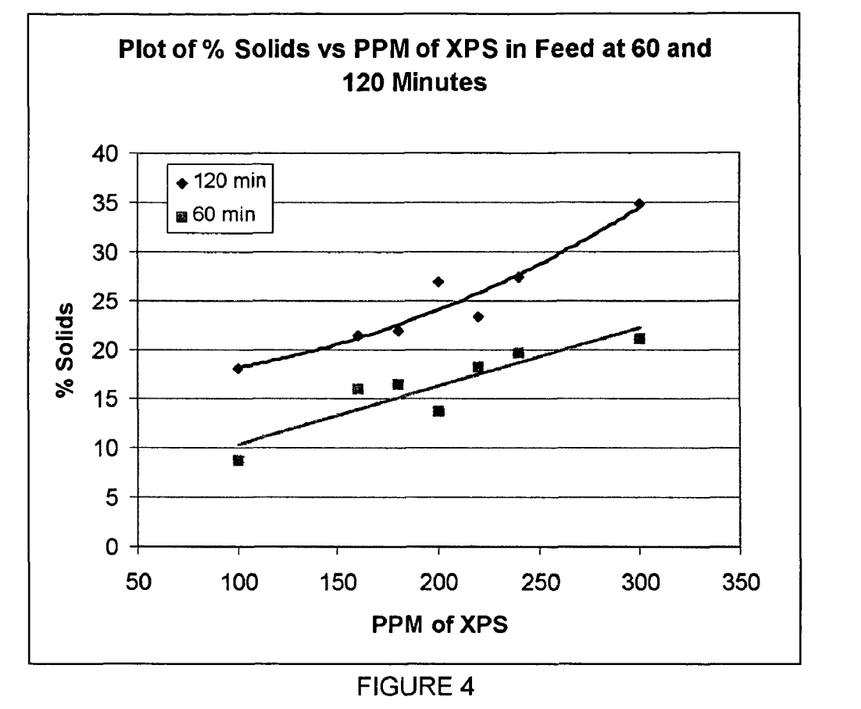
FIG. 4 is a plot of the % solids versus concentration (ppm) for HIPS produced with initiator XPS at 60 minutes and 120 minutes.

Table 3 and is a plot of % solids versus the concentration in ppm, for a feed solution containing 6% rubber. Measurements were done on aliquots taken at 60 and 120 minutes, and the analysis was done by evaporating unreacted monomer. Both Table 3 and FIG. 4 show that XPS causes an increase in polystyrene conversion.

The volume median rubber particle size (RPS) is also shown in Table 3, and is measured by a Malvern Analyzer in methyl ethyl ketone. RPS is expressed as the median volume in microns, and D[0.5] shows the average size of 50% of the particles, while D[0.1] shows the average size of 10% of the particles. The particle sizes of the HIPS made with XPS are comparable to that of the control initiator L-233, which have

TABLE 3

HIPS Properties Comparison

| Sample Name | % Gels | Swell Index | Final Conversion | % Rubber | Gel/Rubber | % Grafting | RPS D[0.1] | RPS D[0.5] |
|---|---|---|---|---|---|---|---|---|
| 170 ppm L-233 | 23.54 | 17.48 | 52 | 11.54 | 2.04 | 104.04 | 0.79 | 1.81 |
| 100 ppm L-233 + 70 ppm XPS | 19.75 | 17.47 | 57 | 10.53 | 1.88 | 87.65 | 0.86 | 1.76 |
| 100 ppm XPS | 23.85 | 14.15 | 50 | 12.00 | 1.99 | 98.75 | 0.74 | 1.51 |
| 160 ppm XPS | 23.54 | 17.48 | 50 | 11.54 | 2.04 | 104.04 | 0.79 | 1.61 |
| 180 ppm XPS | 33.23 | 11.16 | 60 | 10.00 | 3.32 | 232.30 | 0.99 | 1.97 |
| 200 ppm XPS | 23.26 | 14.41 | 80 | 7.50 | 3.10 | 210.18 | 0.86 | 1.81 |
| 220 ppm XPS | 28.60 | 11.09 | 63 | 9.52 | 3.00 | 200.26 | 0.72 | 1.51 |
| 240 ppm XPS | 31.40 | 11.44 | 68 | 8.82 | 3.56 | 255.86 | 0.77 | 1.77 |
| 300 ppm XPS | 34.35 | 13.60 | 62 | 9.68 | 3.55 | 254.94 | 0.80 | 1.76 |

Table 3 compares HIPS properties of materials produced using initiators XPS and L-233 in a pre-inversion reactor. The additional tests verified the increased rates of polymerization.

As shown in Table 3, the rubber chemistries are generally similar for the initiators. These results indicate that "normal" rubber phase properties are attainable at high polymerization rates with certain "low" temperature initiators. At the 100 ppm level, XPS showed HIPS properties that were comparable to the control, but more importantly showed both improved gel/rubber ratios and grafting efficiency at higher levels, with a lower swell index than that of the control. Also at higher concentrations of XPS, the HIPS properties were improved.

It is well known that the impact properties of HIPS are determined by the properties of the rubber phase volume (RPV); thus, an improvement in the gel to rubber ratio (G/R) is highly desirable. The studies also show that the swell index can be lowered by using XPS, while still improving the gel to rubber ratio.

Figure 3:
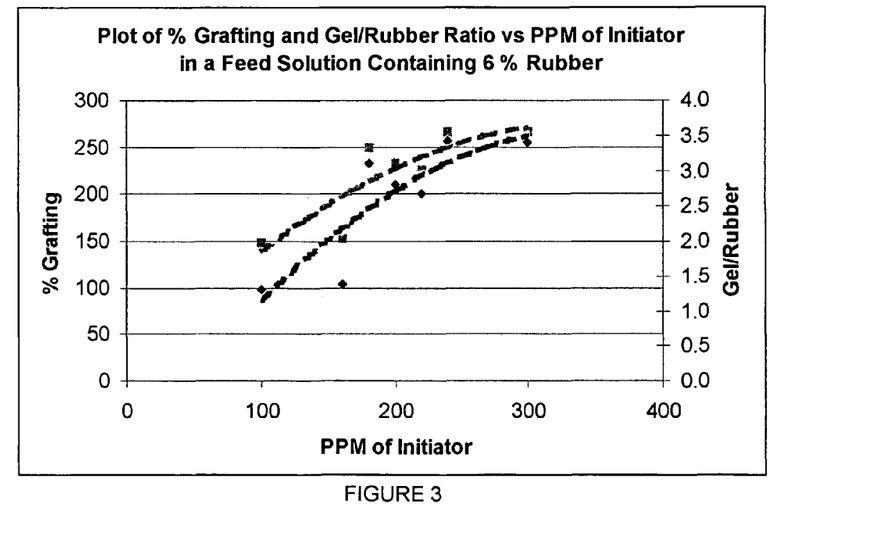
FIG. 3 is a plot of the % grafting and gel to rubber ratio versus initiator concentration (ppm) for HIPS produced with initiator XPS.

Table 3 shows an improvement in grafting values as the level of XPS is increased. This is also reflected in FIG. 3, which is a plot of % grafting and the gel/rubber ratio versus the concentration in ppm. The top line in FIG. 3 reflects the gel/rubber ratio and shows an increase with an increased concentration of initiator. Similarly, the bottom line in FIG. 3 reflects the % grafting, and shows an improvement in grafting as the level of XPS is increased.

Table 3 also shows that XPS increases the "rubber efficiency" of the process, as less rubber is needed to produce a set of desired properties in a HIPS material.

Table 3 further shows the final conversion of the samples made with the XPS initiator and a combination of L-233 and XPS. Table 3 shows that HIPS prepared with XPS has a higher final conversion rate than that of L-233. FIG. 4 is related to been found to be commercially acceptable. Particle size is important to give the optimum gloss and impact strength.

Thus it is shown that the use of particular "low" temperature initiators in conjunction with conventional higher temperature peroxide initiators in the production of HIPS allows more rapid production rates while improving rubber phase volume and grafting, and decreasing the amount of rubber necessary to produce HIPS. The time and costs for producing. HIPS are also reduced, thereby increasing output and profitability.

The HIPS of this invention can be used in a variety of applications and include, but are not limited to cups, plates, food packaging, articles that are injection molded, extrusion molded, or sheet molded articles, packaging applications, toys, refrigerator linings, furniture, household appliances, household goods, electrical appliances and the like. The polymers of this invention can also be used to make sheets, films, and biaxially oriented films, as well as a variety of other products, some of which have one-time uses.

In the foregoing specification, the invention has been described with reference to specific embodiments thereof, and has been demonstrated as effective in providing methods for preparing polymers using multifunctional peroxide initiators. However, it will be evident that various modifications and changes can be made thereto without departing from the scope of the invention as set forth in the appended claims. Accordingly, the specification is to be regarded in an illustrative rather than a restrictive sense. For example, specific combinations or amounts of vinylaromatic monomers, diene polymers, peroxide initiators, and other components falling within the claimed parameters, but not specifically identified or tried in a particular polymer system, are anticipated and expected to be within the scope of this invention. Also, the cited examples of initiators that can be used as "low", "intermediate" and "high" temperature initiators are illustrative and not intended to limit the scope of useful initiators for the various stages of the present process. Further, the methods of the invention are expected to work at other conditions, particularly temperature, pressure, and concentrations, than those exemplified herein.

We claim:

1. A method of forming high impact polystyrene (HIPS) comprising:
   contacting styrene and an elastomer with a lower temperature peroxide initiator within a pre-inversion reactor to form a pre-inversion mixture, wherein the lower temperature peroxide initiator exhibits a 1 hour half-life decomposition temperature of from 95° C. to 111° C.;
   passing the pre-inversion mixture from the pre-inversion reactor to a polymerization vessel;
   forming high impact polystyrene within the polymerization vessel; and
   recovering high impact polystyrene from the polymerization vessel.

2. The method of claim 1 further comprising contacting the pre-inversion mixture with a higher temperature peroxide initiator, wherein the higher temperature peroxide initiator comprises a 1 hour half-life decomposition temperature that is higher than a 1 hour half-life decomposition temperature of the lower temperature peroxide initiator.

3. The method of claim 1, wherein the lower temperature peroxide initiator contacts the styrene and elastomer prior to particle formation.

4. The method of claim 1, wherein the HIPS exhibits higher grafting than HIPS formed via an identical process absent contact of the styrene and elastomers with the lower temperature peroxide initiator within the pre-inversion reactor.

5. The method of claim 1, wherein the lower temperature peroxide initiator is selected from 1,1,3,3-tetramethylbutyl peroxyacetate (TOPA); 1,1,3,3-tetramethylbutyl peroxypropionate (TOPP); 1,1,3,3-tetramethylbutyl peroxy-3,5,5-trimethylhexanoate; di-1,1,3,3-tetramethylbutyl diperoxyadipate; 1,1,3,3-tetramethylbutyl peroxybenzoate (TOPB); di-1, 1,33-tetramethylbutyl diperoxyterephthalate (DTODPA) and 1-methoxy-1-t-mylperoxycyclohexane (TAPMC), and combinations thereof.

6. The method of claim 2, wherein the higher temperature peroxide initiator is selected from diacylperoxides, peroxydicarbonates, dialkylperoxides, peroxyesters, peroxyketals, hydroperoxides and combinations thereof.

7. The method of claim 2, wherein the higher temperature peroxide initiator exhibits a 1 hour half-life decomposition temperature of from 111° C. to 140° C.

8. High impact polystyrene (HIPS) formed from the method of claim 1.

* * * * *